(12) United States Patent
Krause

(10) Patent No.: US 6,575,487 B1
(45) Date of Patent: Jun. 10, 2003

(54) BOAT LAUNCHING/RETRIEVAL/ TRANSPORT APPARATUS AND METHOD

(76) Inventor: Herbert K. Krause, 6059 Guide Meridian, Bellingham, WA (US) 98226

( * ) Notice: Subject to any disclaimer, the term of this patent is extended or adjusted under 35 U.S.C. 154(b) by 0 days.

(21) Appl. No.: 09/935,486

(22) Filed: Aug. 22, 2001

Related U.S. Application Data

(60) Provisional application No. 60/278,167, filed on Mar. 22, 2001.

(51) Int. Cl.⁷ .................................................. B60P 3/10
(52) U.S. Cl. ................. 280/414.1; 114/344; 280/43.23; 414/476; 414/483
(58) Field of Search ........................... 280/414.1, 414.2, 280/414.3, 6.154, 401, 404, 414.5, 43, 46, 43.17, 43.23, 43.22, 789; 114/344; 414/483, 484, 485, 476

(56) References Cited

U.S. PATENT DOCUMENTS

| | | | |
|---|---|---|---|
| 2,919,825 A | * | 1/1960 | Hornsby |
| 2,990,966 A | * | 7/1961 | Scramm |
| 3,003,780 A | * | 10/1961 | Lundahl |
| 3,018,906 A | * | 1/1962 | Franklin |
| 3,079,616 A | * | 3/1963 | Byberg |
| 3,155,249 A |   | 11/1964 | Johnson |
| 3,288,315 A | * | 11/1966 | Brgden |
| 3,512,667 A |   | 5/1970 | Calkins |
| 3,568,624 A | * | 3/1971 | Bjorklund ................. 280/414.1 |
| 3,608,754 A |   | 9/1971 | Park |
| 3,768,677 A |   | 10/1973 | Moss |
| 3,888,367 A |   | 6/1975 | Cox |
| 4,395,185 A |   | 7/1983 | Whaley |
| 4,417,841 A | * | 11/1983 | Chadwick ................... 414/346 |
| 4,735,545 A | * | 4/1988 | Knijpstra ................... 414/474 |
| 4,801,153 A |   | 1/1989 | Wilson |
| 5,228,713 A |   | 7/1993 | Kovach |
| 5,366,336 A | * | 11/1994 | Friesen et al. .............. 414/476 |
| 5,678,977 A | * | 10/1997 | Nordlund .................... 414/458 |
| 5,857,823 A |   | 1/1999 | MacEachern |
| 5,921,742 A |   | 7/1999 | Gearhart |
| 6,341,793 B2 | * | 1/2002 | Braun ..................... 280/414.1 |

* cited by examiner

*Primary Examiner*—Anne Marie Boehler
(74) *Attorney, Agent, or Firm*—Robert B. Hughes; Hughes Law Firm, PLLC

(57) ABSTRACT

A transport apparatus to launch a boat into the water and retrieve the boat from the water. There is an elongate main frame having forward and rear main frame sections pivotally connected to one another along a transverse axis at approximately a mid location along the length. At the forward end of the main frame, there is an operating station and also forward wheels which are capable of turning a full ninety degrees in either direction, and there are at the opposite end rear support wheels which can be raised or lowered. When a boat is being taken out of the water, the apparatus is moved so that its rear end moves into the water, the rear wheels are raised to lower the rear frame section and the two main frame sections are articulated relative to one another to lower the pivot location. In this configuration the boat can be brought onto the rear main frame section, the rear section raised, and the boat carried out of the water. In a similar manner, the boat could be deposited with the launch pad back into the water.

50 Claims, 9 Drawing Sheets

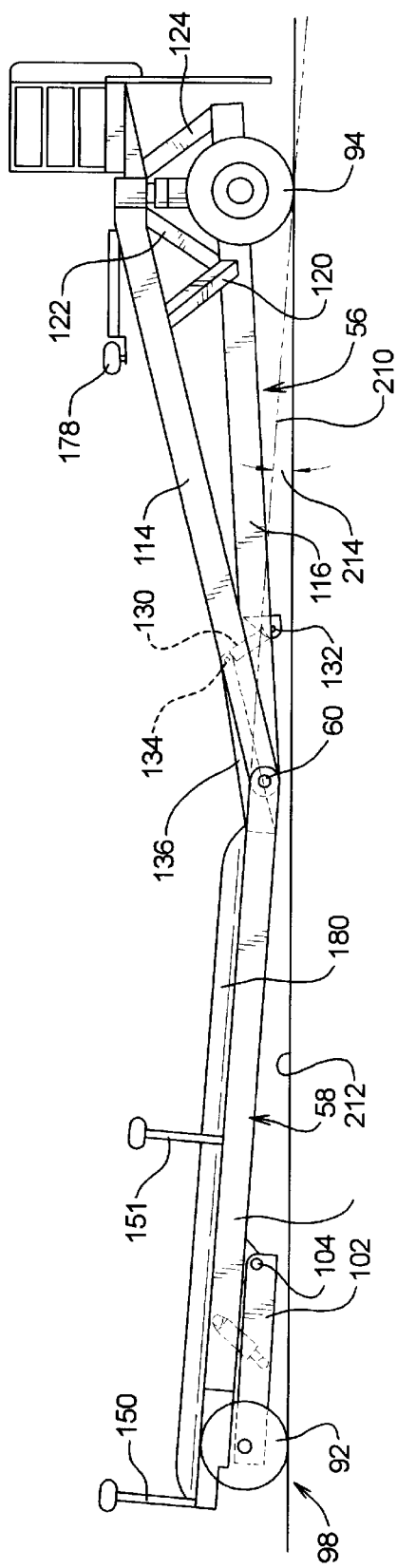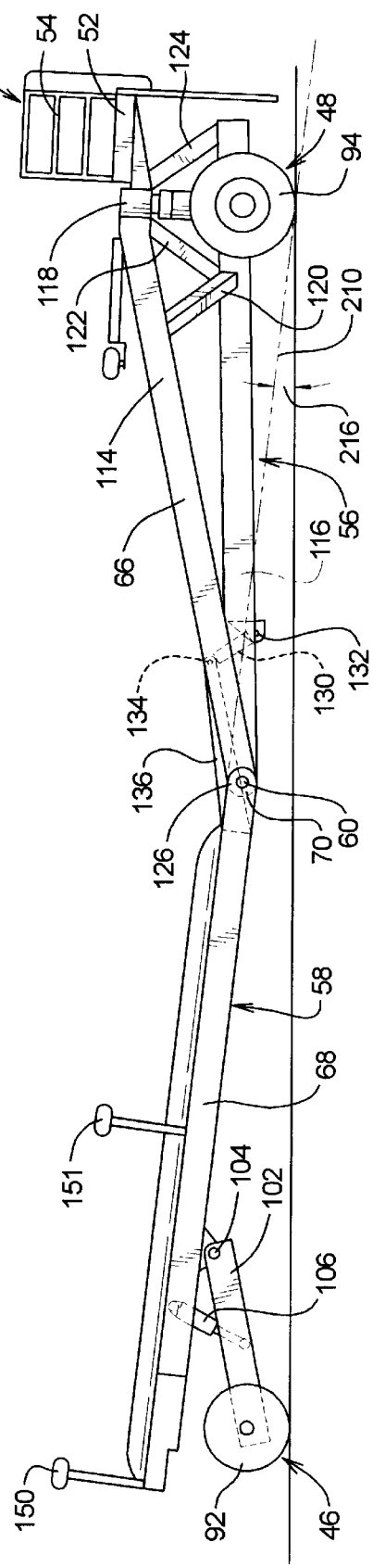

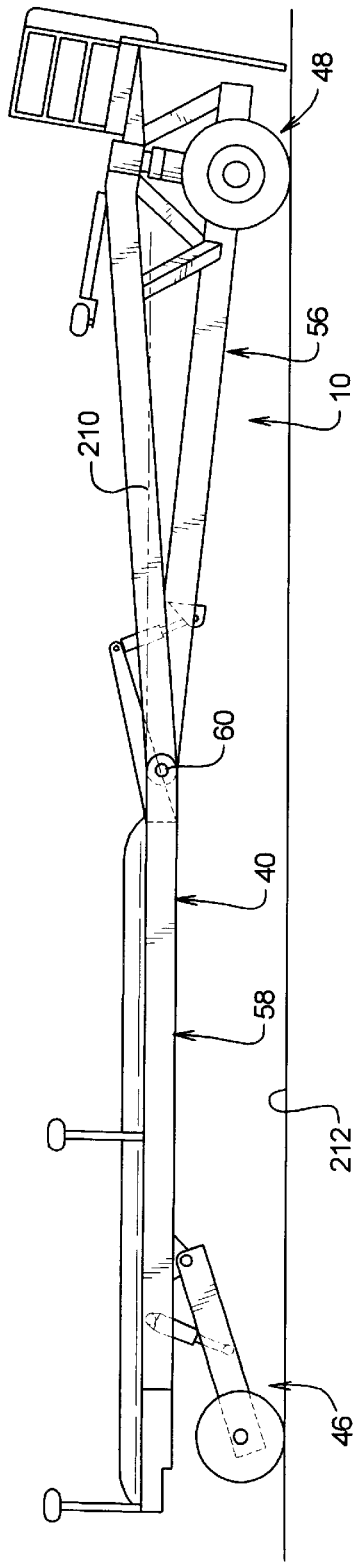
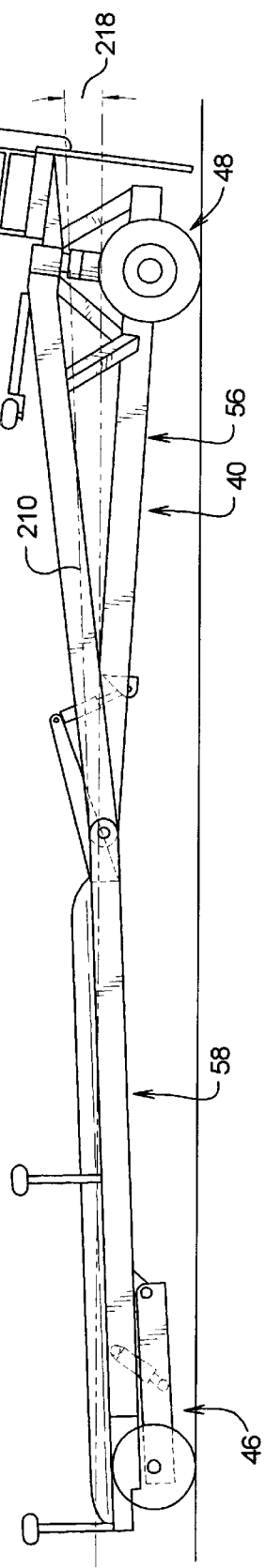

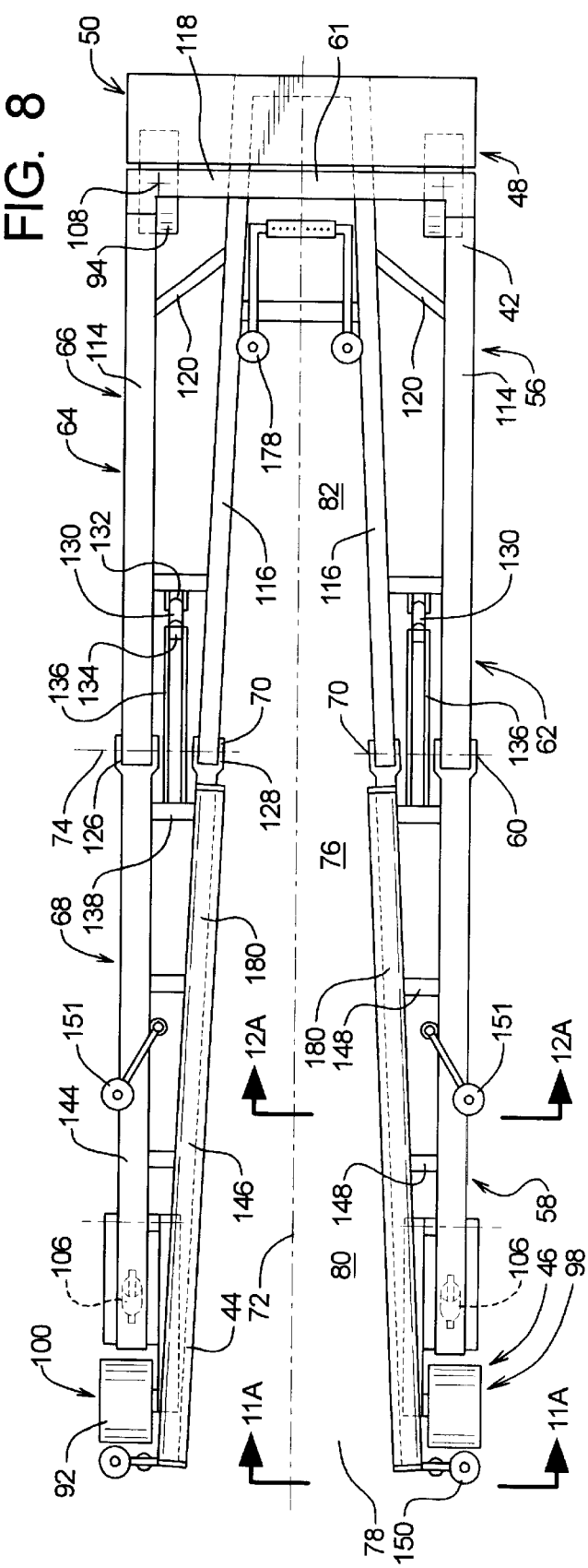

BOAT LAUNCHING/RETRIEVAL/TRANSPORT APPARATUS AND METHOD

CROSS REFERENCE TO RELATED APPLICATIONS

The present application claims the benefit of U.S. Provisional Application Ser. No. 60/278,167, filed Mar. 22, 2001, entitled "Boat Launching/Transport Apparatus and Method".

FIELD OF THE INVENTION

The present application relates to an apparatus and method particularly adapted for the launching of a boat into the water, retrieving the boat out of the water, or both launching and retrieving the boat, as well as transporting the boat over a ground surface.

BACKGROUND OF THE INVENTION

Smaller boats are commonly carried on boat trailers and are placed into the water or taken back out of the water generally by first finding a boat launching site where there is a slanting support surface (generally graveled or asphalt) which slopes downwardly into the body of water. The trailer is backed downwardly down the boat ramp to a depth where the boat is able to float. Then the boat is disconnected and moved away from the trailer, with the trailer then being pulled back out of the water. However, while this procedure is used quite commonly for smaller boats, it is for a variety of reasons it is used less frequently (if at all) for larger boats.

In a marina, boats of various sizes are taken out of the water for services, repair and/or storage, and at a later time are placed back into the water. A typical marina faces various challenges in having an efficient and cost effective operation. For example, the real-estate for a marina is generally at a premium, and thus the real-estate in storing the boats must be used efficiently. Further, the moving the boats into and out of the water, and into and out of storage spaces should be desirably be accomplished in the minimum amount of time. Also, there is the problem of what be termed "traffic congestion" in moving a number of boats effectively.

It's not surprising that the larger boats present challenges well beyond those that are faced with handling the smaller boats. To the best knowledge of the inventor herein, in most marinas the larger boats are usually launched into the water or taken out of the water by means of a lifting device (e.g. a hoist). Straps or other devices are placed around the boat hull, and these are engaged by the hoist to move the boat into or out of the water. With a relatively large boat (as long as forty or fifty feet), a rather large hoist is required. Again, to the best knowledge of the Applicant, it has not been practical to use the boat trailer for such large boats. Also, if trailers of sufficient size are used for the larger boats, there is the consideration of the mobility (i.e. the ability to effectively move such a large boat within the confines of a sometimes crowded marina boat storage area).

A search of the U.S. patent literature has revealed a number of patents relating to the launching and retrieval of boats into and from a body of water, and these are the following.

U.S. Pat. No. 5,857,823 (MacEachern), shows a trailer made up of two support structures, namely a rear support structure 18 made up of parallel beams, and a forward structure 20, these being rigidly connected to one another. At the forward end of the structure 20, there is a connection to what is called "a self-propelled tug 14". The tug has forward steering wheels 64 which are stated to operate as a conventional steering mechanism, and at the rear of the tug 14 there is a universal connection which is controlled by hydraulic cylinders. Thus, this universal joint can rotate about all three axes. Also, the rear wheels 24 of the trailer are mounted so that these can be raised or lowered individually or together.

U.S. Pat. No. 5,921,742 (Gearhart), shows an articulated roll-off trailer that is provided with a hinge so that it may bend in the middle, in an upward direction.

U.S. Pat. No. 5,228,713 (Kovach), shows a boat trailer that has an upper boat carrying a section 18, and a lower wheeled frame 19, that are pivoted in the tongue area. The boat carrying section remains level at the water's surface as the wheeled section follows the contours of the bank, or launching ramp.

U.S. Pat. No. 4,801,153 (Wilson), shows a trailer that is pivoted for easier loading. It may be backed along a bank or launching ramp, and tilted so the boat or other cargo slides or rolls off.

U.S. Pat. No. 4,395,185 (Waley), shows a boat trailer in which the wheel carrying frame is pivoted on the frame section on which the boat is mounted on. The wheel section follows the contours of the bank or the launch ramp, while the boat carrying part floats and is well oriented to load the boat.

U.S. Pat. No. 3,888,367 (Cox), shows a boat trailer with pivoted boat supporting elements that accommodate the contour of the boat bottom.

U.S. Pat. No. 3,768,677 (Moss) provides a boat trailer with wheels that can be adjusted relative to the trailer frame to accommodate the loading and unloading, on various bottom contours.

U.S. Pat. No. 3,608,754 (Park), shows a boat trailer in which the hitch and wheels are on a frame and a sub frame is pivoted at one end and supporting the boat at the other end. The sub frame supports the boat's stern and aligns it as it floats on or off the trailer.

U.S. Pat. No. 3,512,667 (Calkins), shows a boat trailer on which the boat support pivots and aligns with the boat as it is moved in or out of the water, while the wheeled sections are on a tilted bottom.

U.S. Pat. No. 3,155,249 (Johnson), shows a trailer that is provided with pivoting hull support elements.

SUMMARY OF THE INVENTION

The apparatus and method of the present invention is designed to launch boats into the water, and also retrieve boats out of the water in a particularly effective way. Also, in a preferred embodiment of the present invention, the apparatus is designed to be used in a manner so that the apparatus can be maneuvered effectively over a ground surface for better utilization of land space in a marina or the like.

The apparatus of the present invention comprises a main support frame having a longitudinal axis, a transverse axis, a front end and a rear end. The main support frame comprises a forward main frame section and a rear main frame section. The forward and rear main frame sections are pivotally connected to one another about a pivot location, so as to be able to be rotated relative to one another between an upper pivot configuration of the main support frame, with the pivot location at a higher elevation, and a lower pivot configuration of the main support frame with the pivot location at a lower elevation.

The forward and rear main frame section are arranged as right and left main frame side portions. Each of the main frame side portions comprises a forward and a rear main frame side portion, and right and left main frame side portions define therebetween a boat receiving region. This boat receiving region comprises a rear entry portion, a rear boat receiving region portion that is located between the right and left main frame rear side portions, and a forward boat receiving region portion located between the right and left forward main frame side portions.

There is a rear wheeled support section which is connected to the rear main frame section. This rear wheeled support section is moveable between upper and lower configurations relative to the main rear frame section. There is also a forward support section connected to the forward main frame section.

The apparatus is arranged so that with the apparatus in an operating position in a body of water, the rear main frame section is able to be located at a first lower ground elevation in the body of water, with the rear support section in its upper configuration and the main support frame in its lower pivot configuration. By lowering the rear support section, the rear main frame section is then at a higher ground elevation in a body of water.

In an embodiment shown herein, each of the main frame side portions has its own pivot connection between its related main frame side portion and main frame rear side portion.

More specifically, each of the rear main frame side portions can rotate independently from one another about its related pivot connection relative to its forward main frame side portion. Also, in this embodiment, the front and rear main frame side portions of each main frame side portion has a related actuator to move the rear main frame portion relative to its related forward main frame side portion.

In this embodiment, the rear wheeled support section comprises left and right wheeled rear support portions, each of which has a wheel portion and a related actuator to raise or lower the wheel portion.

Also, in the configuration shown herein the forward main frame section has a front end frame portion connected between forward end portions of the forward main frame side portions. At the forward support section there is a steerable wheel section. The steerable wheel section comprises in a preferred form at least two steerable wheels spaced laterally from one another with each steerable wheel having its own steering axis about which each steerable wheel can be rotated through various steering positions. Also, there is an operating station at the forward location of the forward main frame section by which an operator can control operation of the apparatus.

In a second embodiment of the present invention, the forward support section comprises a connection component adapted to be connected to a towing apparatus to move the transport apparatus.

In a preferred arrangement, the rear wheeled support section is arranged to provide ground support at a support location at a rear portion of the rear main frame section.

The rear support section has a rear ground engaging support location and the forward support section has a forward support location by which the forward main frame section is supported from a ground surface. The pivot location is located at a pivot location spacing distance between about one third to three quarters of a distance from said rear ground engaging support location to the forward support location. Within narrower limits, the pivot location spacing distance is no greater than about two thirds of the distance from the rear ground engaging support location to said forward support location. With yet narrower limits, the pivot location is between about two fifths to three fifths of the distance from the rear ground engaging support location to the forward support location. As an approximation, the pivot location is about one half the distance from the rear ground engaging support location to the forward support location.

The two rear main frame side portions each have a longitudinally extending boat engaging support portion. Each of the support portions comprises a longitudinally extending inflatable bunker to provide support for a boat being positioned thereon.

The apparatus is desirably arranged in size so as to be able to support a boat of a smaller length dimension, and also a boat up to a larger maximum length dimension extending into the forward boat receiving portion. The rear main frame section is configured and has a length such that a boat of the maximum length dimension being carried by the apparatus has a center of gravity which, when the boat is positioned on the apparatus, is behind the pivot location. Thus at least a substantial portion of the weight of the boat is supported by the inflatable bunkers.

The apparatus is arranged so that rear main frame section is able to support at least a substantial portion of weight of a boat having a lengthwise dimension at least as great as or greater than a lengthwise dimension of the rear main frame section so that when the boat is carried by the apparatus, a forward end portion of the boat extends into the forward boat receiving region portion. The right and left rear main frame side portions have longitudinally extending support surface portions which engage the boat and which are positioned in a boat support reference plane. The apparatus has a ground support reference plane which is defined at a rear support location by a rear ground support location of the rear support section and at the forward end of the apparatus by a forward ground support location of the forward support section. The apparatus is arranged so that with the rear support section in its lower configuration, and with the main support frame being in its lower pivot configuration, the boat support reference plane has a downward and forward slant relative to the ground reference plane.

Also, the apparatus is arranged so that with the rear support section being in its upper configuration and the main support frame being in its lower pivot configuration the downward and forward slope relative to the ground support reference plane is between about 2° to 12°.

Also, the apparatus is arranged so that with the rear support section being in its lower configuration and the main support frame being in its lower pivot configuration, the boat support plane of the apparatus has a forward and downward slope relative to the support reference plane. Also, the apparatus is arranged so that with the rear support section in its upper configuration and the main support frame being in its lower pivot configuration the boat support reference plane of the apparatus has a forward and downward slope relative to the ground support reference plane at an angle between about 0° to 10°. Further, the apparatus is arranged so that with the support section being in its upper configuration and the main support frame being in its upper pivot configuration, the boat support reference plane of the apparatus does not have a forward and downward slope relative to the ground support reference plane, and desirably has a forward and upward slope relative to the ground support reference plane.

Also, in a preferred form, the apparatus is arranged so that with the rear support section being in its lower configuration and the main support frame being in its upper pivot configuration the boat support reference plane of the apparatus is approximately parallel to the ground support reference plane, and desirably between 4° in an upward forward slant and 4° in an upward and rearward slant.

In the method of the present invention, the apparatus is provided as indicated above, and when operating as an apparatus to remove the boat from the body of water, the boat is located in the body of water over the rear main frame section with the rear support section in its upper configuration and the main support frame section in its lower pivot configuration. Then the rear support section is lowered to raise the rear main frame section to a higher elevation to raise the boat in the body of water. Then the apparatus is moved to carry the boat in a direction from the body of water.

Also in the method of the present invention, the boat can be launched from a land location into the body of water, and this is accomplished in substantially the reverse order of the method of retrieving the boat from the body of water. More specifically, the boat is located on the apparatus, and the apparatus is moved into the body of water. Then the rear main frame section is located at a lower ground elevation in the body of water, with the rear support section in its upper configuration and the main support frame in its lower pivot configuration so that the boat is substantially supported by a flotation force of the water.

BRIEF DESCRIPTION OF THE DRAWINGS

FIGS. 4, 5, 6 and 7 are views showing the apparatus of the present invention in various configurations where the rear support section is in its upper configuration or lower configuration and the main frame is in its upper pivot configuration or lower configuration.

FIG. 8 is a top plan view of the apparatus of the present invention;

FIGS. 9a and 9b are two schematic top plan views showing only the rear support wheels and front steerable support wheels of the present invention and illustrating the FIG. 9a, the turning of the wheels, and in 9b the travel of the front wheels in a lateral direction;

FIG. 12b is a view of the positioning device of FIG. 12a, but taken from an upper location looking downwardly on the device of FIG. 12a;

DESCRIPTION OF THE PREFERRED EMBODIMENT

Figure 1:
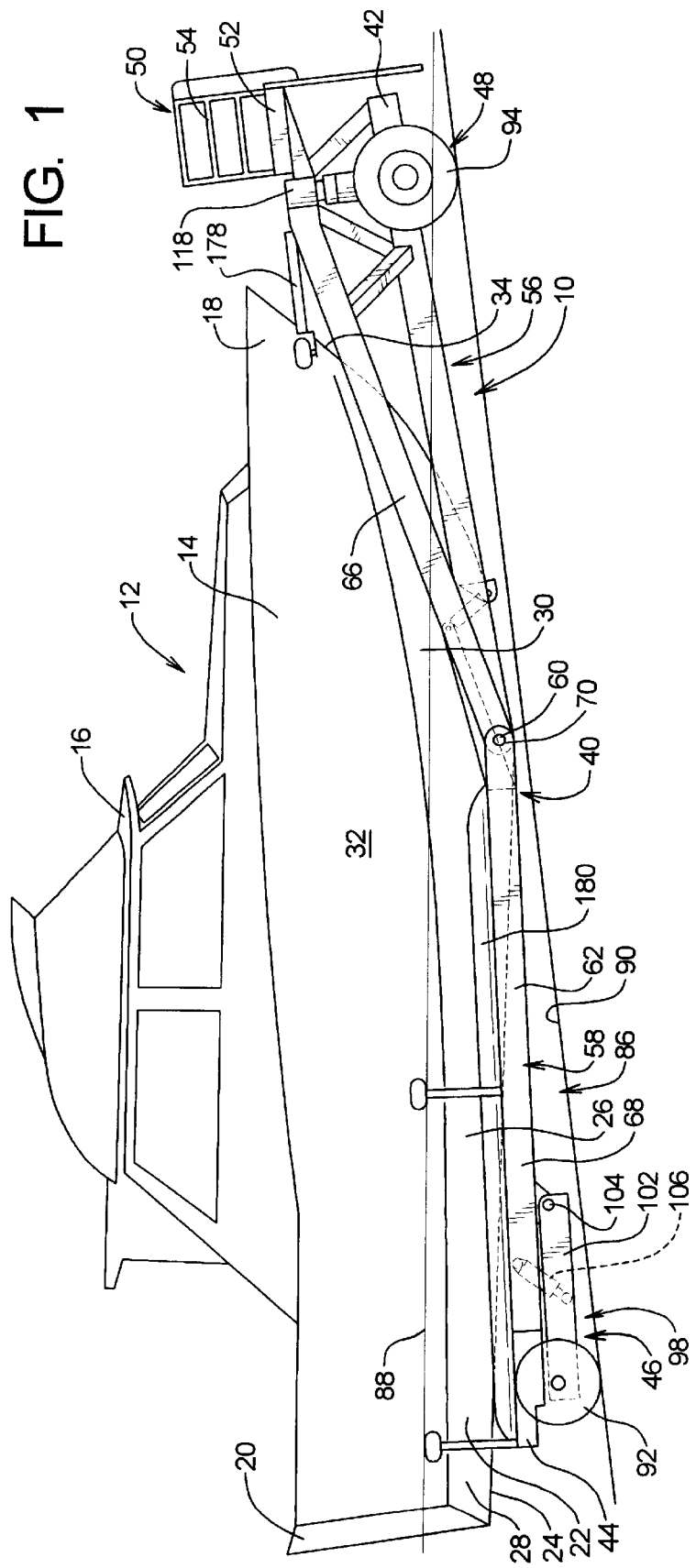
FIG. 1 is a side elevational view of the apparatus of the present invention in an operating position in a body of water with a boat positioned so as to be ready to be retrieved from the body of water.
Figure 2:
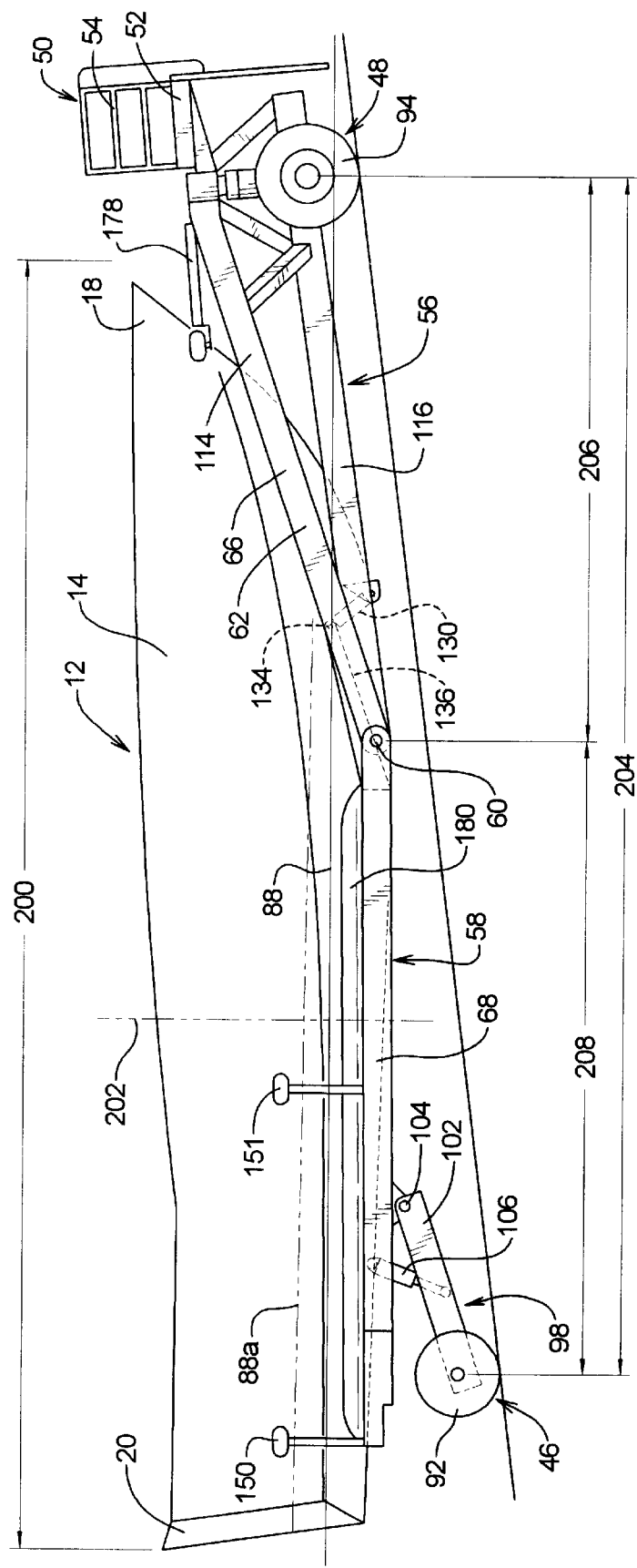
FIG. 2 is a view similar to FIG. 1, but showing the rear main frame section being raised to partially lift the boat from the body of water.
Figure 3:
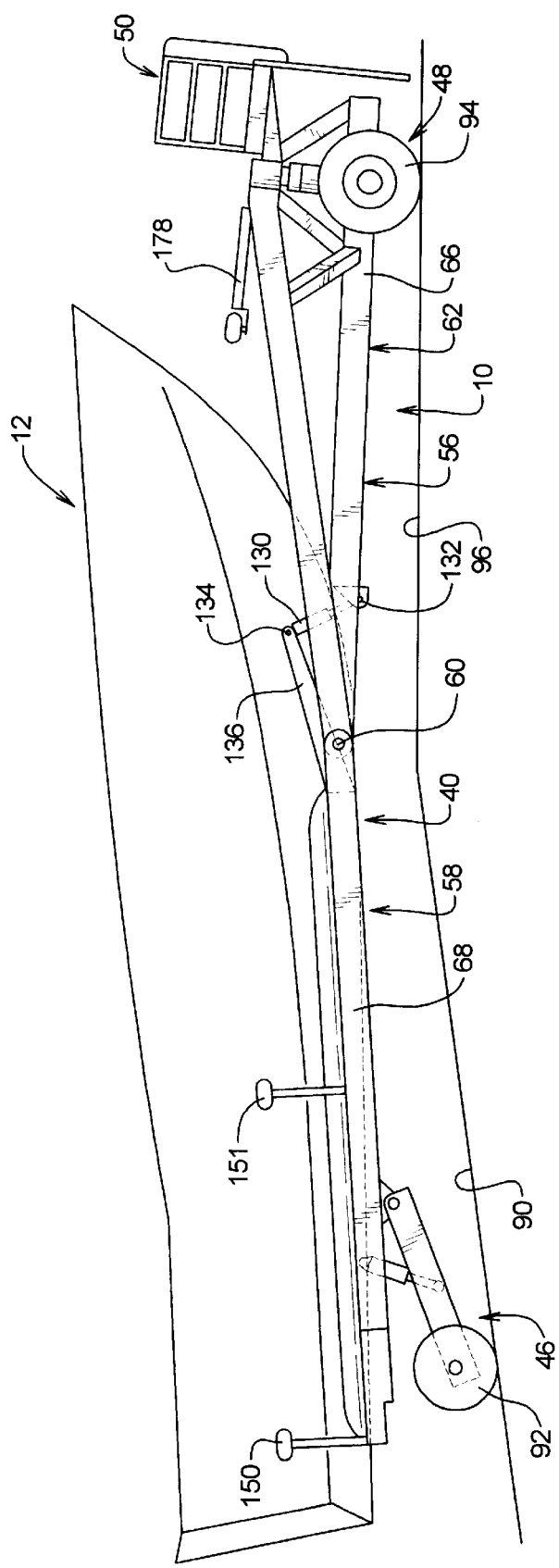
FIG. 3 is a view similar to FIGS. 1 and 2, but showing only the hull of the boat, and showing the boat being carried out of the water.
Figure 13:
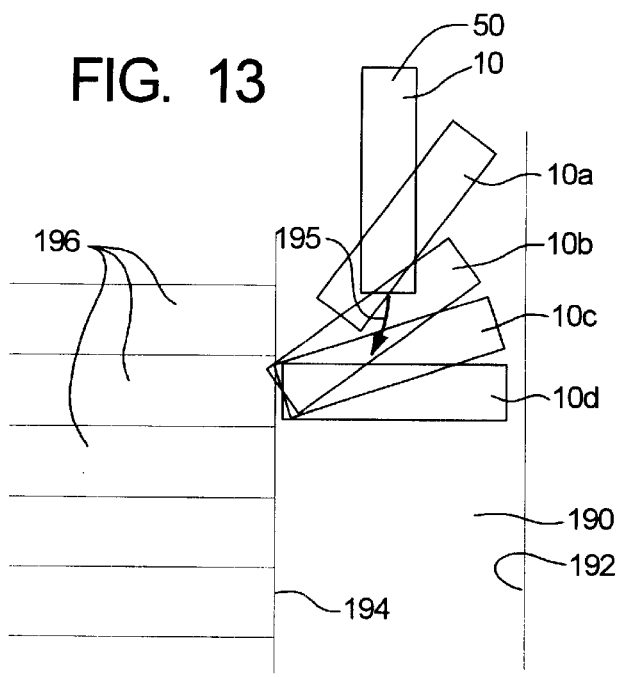
FIG. 13 is a schematic top plan view illustrating the manner in which the apparatus of the present invention can be moved into a storage slot in a marina.

In FIG. 1, the boat transport/launching apparatus 10 of the present invention is shown with a boat 12, which is positioned relative to the apparatus 10 to be carried out of a body of water. As will be discussed later herein, this apparatus 10 is able to carry the boat 12 into the water to launch the boat, carry the boat out of the body of water (as is shown in FIGS. 2 and 3), and also to carry the boat over the land surface as in parking the boat in a location in a boat yard (as illustrated in FIG. 13). For convenience of description, the apparatus 10 will simply be referred to as the "transport apparatus" in the following text.

It is believed that an understanding of the present invention will be better obtained by describing the invention in the following format. First, there will be a general description of the transport apparatus 10, second a preliminary description of the basic operation of the present invention with reference to FIGS. 1, 2 and 3, third a more detailed description of the apparatus 10, along with a discussion of various facets of the present invention, along with possible alternatives, and fourth a brief description of a second embodiment.

a) General Description of the Transport Apparatus 10.

The apparatus 10 is particularly well adapted to be used for a boat having a hull configuration of a cabin cruiser of more or less conventional design as shown at 12, and accordingly in the following description, the boat 12 which is being carried will be assumed to be such a cabin cruiser. However, it is to be understood that within the broader scope of the present invention, the apparatus 12 and the methods employed by the same would also be adapted to handle boats of other configurations.

There will first be an introductory description of the overall configuration of the boat 12 (i.e. a conventional cabin cruiser). This boat 12 comprises a hull 14 and a cabin structure 16 (shown only in FIG. 1 for ease of illustration). The boat has a bow 18, a stern 20, and a hull bottom surface 22. There is a center keel line 24, and the bottom hull surface 22 comprises right and left bottom surface portions 26 on opposite sides of the keel line 24. Further, each bottom surface portion 26 can be considered as having a rear bottom surface portion 28 and a forward bottom surface portion 30. As is conventional with this type of cabin cruiser, the side walls 32 of the hull are spaced further from one another in the rear portion of the boat 12 and converge toward one another in the forward part of the boat 12 to meet at a front juncture line (a prow line 34). In like manner the bottom surface portions 26 become narrower and have a greater upward and lateral slant at its forward portion.

The transport apparatus 10 of the present invention comprises a main frame 40, having a front end 42 and a rear end 44, a rear wheeled support section 46, a front wheeled support and steering section 48, and an operating section 50, having an operating platform 52 and a support rail 54 surrounding the platform 52.

To describe the main frame 40 in more detail, the frame 40 has a front frame section 56, and a rear frame section 58, with these being joined to one another at a pivot location 60 which is approximately at the mid-length of the frame 40. Also, in terms of function and structure the frame 40 can be considered as having (as seen in FIG. 8 in plan view), an overall U-shaped configuration, comprising a forward frame portion 61 and right and left side frame portions 62 and 64, respectively. Further, each of these side frame portions 62 and 64 has a forward side frame portion 66 and a rear side frame portion 68, with each pair of front and rear side portions 66 and 68 being connected to one another by means of a respective pivot connection 70 at the pivot location 60. The forward side frame portions 66 connect to one another by means of the forward frame portion 61 which is part of the front frame section 56. Also the two forward side frame portions are part of the front frame section 56, and the two rear side frame portions comprise the rear frame section 58.

The frame 40 can be considered as having a longitudinal center axis 72 extending the length of the apparatus 10, and also a transverse axis 74, which for purposes of description will be considered being located at the pivot location 60.

The frame 40 has a boat receiving region 76 extending substantially the entire length of the frame 40, and comprising a rear entry portion 78, a rear receiving region portion 80 located between the rear side frame sections 68, and a forward receiving region portion 82 located between the forward side frame section 66.

b) General Description of the Operation of the Apparatus 10.

With the basic configuration of the transport apparatus 10 being given, we will now proceed to the next phase of this description, with reference to FIGS. 1, 2 and 3 and describe the basic method of the present invention in taking the boat 12 out of the water.

Reference is now made to FIG. 1. Let us assume that the boat 12 is already floating in a body of water indicated at 86, and having a water surface 88, and it is now desired to take the boat out of the water at the location of a more or less conventional slanted launching ramp having an upwardly facing slanted ramp surface 90. Initially, the transport apparatus 10 is backed downwardly along the ramp surface 90 into the water 86 with the rear wheeled support section 46 in a retracted position so that the rear end of the rear frame section 58 is at its lowermost position. Further, the front and rear frame sections 56 and 58 have been rotated relative to one another about the pivot location 60 so that the pivot location of the frame 40 is at its lowermost position so as to be proximate to the ramp surface 90. With the transport apparatus 10 being in the configuration as shown in FIG. 1, the boat 12 is then operated to move the boat through the rear entry 78 and into the boat receiving region 76. The boat shown in FIGS. 1–3 is a relatively large boat 12 having an overall length as great as (or possibly even greater than) the entire frame 40. As will be discussed hereinafter, the apparatus 10 is capable of handling a boat of larger length (as shown in the drawings), and also a boat of substantially shorter length.

The boat 12 is moved forward in the boat receiving region 76 until the rear portion of the boat is located in the rear receiving region portion 80 and the forward portion of the boat is located in the forward receiving region portion 82. In this position, as shown in FIG. 1, the boat is still entirely supported by the flotation force of the water, or is substantially fully supported by the flotation force in the water.

The next step is shown in FIG. 2, and this is to lower the rear wheeled support section 46 so that the rear support wheels 92 of the rear wheeled section 46 are moved downwardly to lift the rear end of the frame 40 upwardly in a rotational movement about the front wheels 94 of the forward wheel support and steering section 48. The front and rear frame sections 56 and 58 are held in a fixed angular position during this operation as the entire frame 40 is lifted. Alternatively, there can be accomplished with possibly a moderate adjustment in the angular position of the two frame sections 56 and 58 for proper clearance or other reasons.

In FIG. 2, there is shown a horizontal line indicating the level of the water surface at 88 with the boat 12 in the raised position in FIG. 2. Also, there is shown in a broken line at 88a the water level relative to the boat when the boat was still afloat in the location of FIG. 1. In the position of FIG. 2, a bottom part of the boat hull 14 is still in the water to provide a certain amount of a buoyancy force, but there is sufficient proportion of the weight of the boat pressing against (and being supported by) the rear frame portion 58 so that the transport apparatus 10 in moving out of the water, is able to move the boat 12 out of the water. Alternatively the boat 12 could be lifted totally out of the wafer in reaching the position of FIG. 2, but there would normally not be any advantage in doing so initially.

In FIG. 3, the boat 12 has been moved up the ramp 90 and completely out of the water, and the rear support wheels 92 are positioned on the more forward location of the sloping ramp 90. The front wheels 94 are shown as being on a level ground surface 96. Further, it can be seen that the alignment of the forward and rear frame portions 56 and 58 has been changed moderately by relative rotation about the pivot location 60, and this could be done, for example, to obtain sufficient clearance from the ground surface as the transport apparatus 10 is moving from a slanted surface to a more level surface.

From the above description, it becomes evident that to launch the boat back into the water, the reverse of the above sequence shown in FIGS. 1, 2 and 3 is accomplished. More specifically, the apparatus 10 and the boat 12 are moved to the location of FIG. 3, and the apparatus 10 moved rearwardly to the launch location of FIG. 2. From the launch location of FIG. 2, the rear wheeled support section 46 has the rear wheels 92 raised to lower the rear portion of the main frame 40, thus putting the boat in the floating position of FIG. 1.

c) More Detailed Description of the Transport Apparatus 10.

To describe the various components of the apparatus 10 in more detail, we will begin first by looking at the rear wheeled support section 48. It can be seen in FIG. 8 that the rear wheel support section 46 comprises right and left rear wheel support sections 98 and 100, each of which comprises its related rear wheel 92 mounted to a related support arm 102 which in turn is pivotally connected at 104 at its forward end to its related rear side frame section 68. There is an actuator 106 (e.g. a piston and cylinder hydraulic) connected between its related arm 102 and its related rear frame portion 68 to extend in a manner to lower each wheel 92 or to contract to raise the wheel 92. It is evident that there could be other actuators in the form of one of a wide variety of mechanisms or devices to accomplish this lifting or lowering function, such as lifting jacks, extendable and retractable linkages, articulated lifting mechanisms, etc. Since such alternative methods are well know to those having reasonable skill in the mechanical arts, these will not be described in detail herein.

Attention is now directed to the forward wheel support steering section 48. The two front wheels 94 are spaced laterally from one another at the front end of the frame 40, and each wheel 94 is mounted for rotation about its own vertical steering axis 108 which is shown schematically in FIG. 8 as being immediately over the center location of its related wheel 94. Thus, as can be seen in the schematic showings of FIGS. 9A and 9B, the two front wheels 94 can be rotated in either direction a full ninety degrees so that the alignment of the direction of the rolling path of the wheel is at ninety degrees to the longitudinal axis 72, as illustrated by the arrows 110 shown in FIG. 9A. In the position of FIG. 9B, the wheels 94 are aligned so that movement of the forward portion of the apparatus 12 is in a transverse direction ninety degree to the longitudinal axis 72, about a rear center of rotation indicated at 112 which is located in transverse alignment with the centers of rotation of the rear wheels 92. The significance of this in enabling the apparatus 12 to move very effectively, for example in a boat yard, will be discussed later in this text with reference to FIG. 13.

The steering of the front wheels 94 can be accomplished in a conventional manner by an operator positioned on the operating platform 52. Further, the front wheels 94 can be driven by suitable individual motors (e.g. hydraulic or electric motors), and since this can be done in a conventional manner, this will not be described in detail herein. Further, while the vertical axis of rotation 108 for each front wheel 94 is shown as being directly over the wheel 94, it could be offset slightly from its wheel 94 and function properly in the present invention. For example, there could be a vertical rotatably mounted support post offset from its wheel 94 and connecting to it wheel 94 through a suitable drive axle.

Let us now turn our attention to the main frame 40, and begin by discussing the forward frame section 56. The two right and left forward frame portions 66 that make up the forward frame section 56 are, or may be, identical, and each comprises an outer longitudinal frame member 114 and an inner longitudinal frame member 116. The forward ends of the outer frame members 114 are connected to one another by a cross member 118 at an upper location on the front frame section 71. It can be seen by observing, for example, any one of FIGS. 4–7, and also observing FIG. 8, that the alignment of the two frame members 114 and 116 is such that their rear ends are at the same transverse location at the same level at the rear pivot location 60, and that the two outer frame members 114 extend parallel with one another to the front location at an upper level of the forward frame section 71. On the other hand, the inner frame members 116 extend forwardly and converge at a slight angle inwardly in a forward direction, and also extend at a moderate downward angle relative to the orientation of the outer frame members 114. This forms a truss like structure to contribute to the overall structural strength of the entire front frame portion 56, and also this arrangement provides the proper clearance in the forward receiving region portion 82.

It is to be understood, of course, that there is proper structural bracing between the inner and outer frame members 114 and 116 as well as for the cross member 118, and at least some of this structural bracing is illustrated in FIGS. 4–7 and also in FIG. 8. For example, there is a pair of diagonal braces 120 extending between related frame members 114 and 116, and also diagonal braces at 122 and 124 extending between the forward portions of the inner frame members 116 that extend somewhat forwardly from the location of the front wheels 94 and of the cross member 118. In addition, there could be, for example, diagonal bracing extending between the central part of the cross member 118 in a rearward and horizontally outward direction to connect to the outer frame members 114 near the forward ends thereof. Also, it is to be understood that the mounting structure for the front wheels 94 would be such so that there would be proper structural bracing and also to make the proper connection with the front frame portion 56 so that the weight loads would be properly transmitted from the frame 40 through the structure to the front ground wheels 94.

With reference to FIG. 8, the rear ends of the two forward frame members 114 and 116 join to one another at the pivot connection 70, this pivot connection actually being made by the two separate pivot connections 126 and 128 that are transversely aligned with one another. There are two positioning actuators (i.e. hydraulic cylinder and piston members 130), each connecting by one end 132 to a cross strut between the frame members 114 and 116, and the other end connecting at 134 to a forward end of a positioning arm 136 that is connected by a cross brace 138 to the forward end of its rear side frame section 68. Thus, extension and retraction of the two cylinder and piston members 130 causes rotation of the positioning arm 136, thus causing relative rotation of the forward and rear main frame portions 56 and 58.

It is obvious that there could be other mechanisms, actuators, linkages and devices to provide relative rotation between the frame sections 56 and 58, such as crank arms rotary actuators, gear drives, etc. Since these are numerous and well known to those of reasonable skill in the mechanical arts, these will not be described in detail herein.

To describe now the rear frame section 58 in more detail, reference is again made to FIG. 8. It can be seen that the rear frame section 58 actually comprises the aforementioned right and left rear frame portions 68. It can also be seen from observing FIG. 8 that these two rear frame portions 68 can each rotate independently of one another about the pivot connections 126 ad 128. Each of these rear frame portions 68 comprises outer and inner frame members 144 and 146 interconnected by suitable cross braces some of which are indicated at 148.

There are two rear guide members 150 and two forward guide members 151 (boat positioning members) which are located at side portions of the rear frame portion 58. The two rear guide members 150 are positioned at the rear end of the rear frame portion 58, and these are shown in elevational view in FIGS. 11A and 11B. Each forward guide member 151 (shown in FIGS. 12A and 12B) comprises a cushioned roller 152 mounted to the top end of a right angle mounting arm 154, with this arm 154 having an upright arm portion 156 and a lateral end arm portion 158 with the inner end of the arm portion 158 being rotatably connected to a rotary mounting section 160 that is in turn connected to the related outer frame member 144. A spring positioning member is provided, as shown at 161 to urge the cushion member 152 toward the longitudinal center axis 72.

Figure 11A:
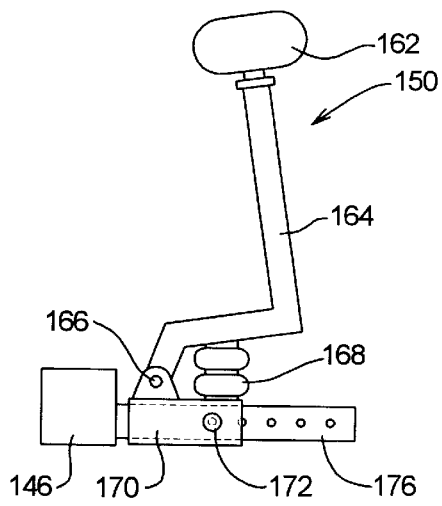
FIGS. 11a and 11b are elevational views showing one of two positioning members of the present invention, in two different positions.
Figure 11B:
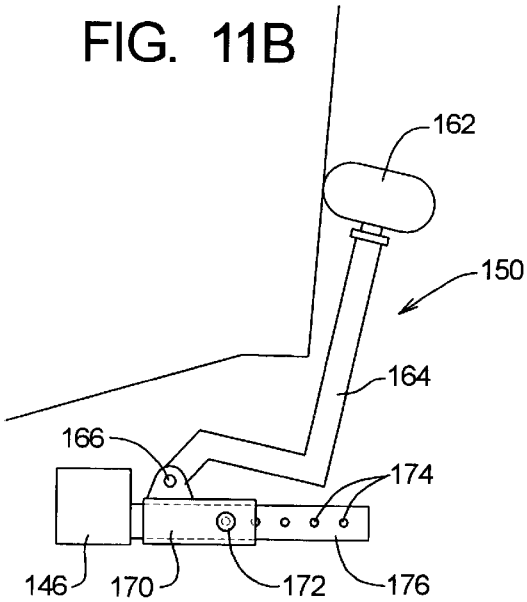
Figure 12A:
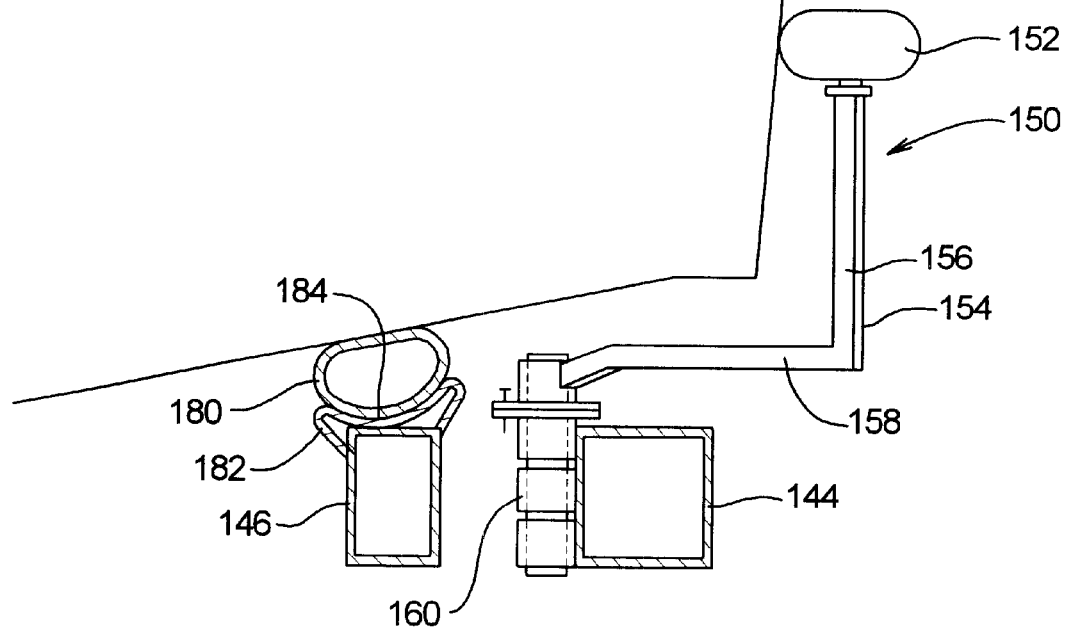
FIG. 12a is a view partially in section, and is taken from a rear location, showing another side positioning device of the present invention.
Figure 12B:
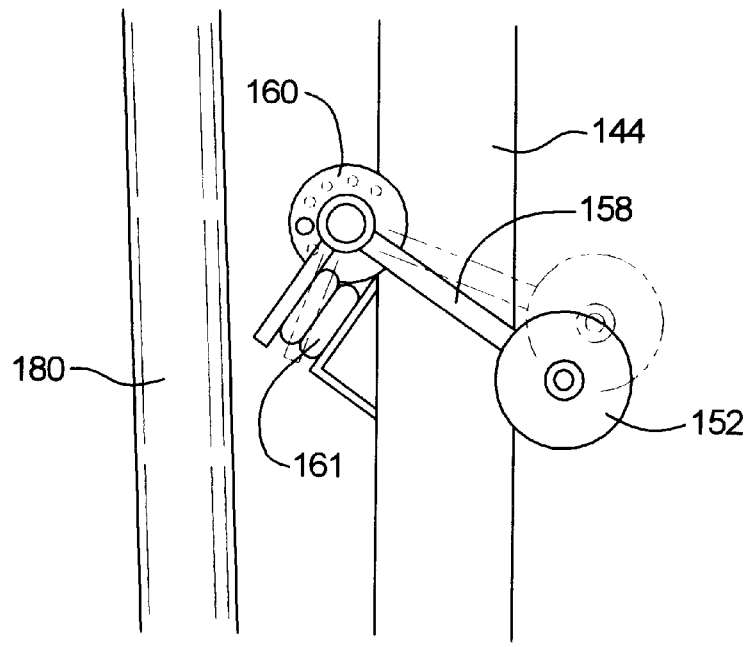

One of the two rear guide members 150 is shown in FIGS. 11A and 11B, and it can be seen that in like manner this comprises a cushion roller 162 connected to a right angle member 164 which in turn is pivotally connected at 166 at the rear end of the inner frame member 146. The pivot connection 166 is aligned longitudinally, and there is a positioning spring 168 (shown only in FIG. 11A) positioned beneath the horizontal portion of the right angle arm 164 to urge the arm 164 inwardly. Also, the pivot connection of the arm 164 is to a sleeve member 170 which has a positioning pin 172 which can be mounted in a selected one of the positioning openings 174 and a mounting member 176. Thus, the lateral positioning of the two guide members 150 can be adjusted laterally by proper positioning of the sleeve member 170.

In like manner forward positioning members 178 can be provided and be constructed in a manner similar to the guide members 150 and 151.

A significant feature of the present invention will now be described with reference to FIGS. 8, 10A, 10B, and 12A.

First, with reference to FIG. 8, there are two substantially identical inflated bunker members 180, each extending the entire length of its related frame member 146. One of the inflatable bunker members is shown in the cross sectional view of FIG. 12A, where it can be seen that the frame member 146 is provided with an elongate cradle 182 which has a uniform-cross section extending the length of the frame member 146. This cradle 182 can be made as a metal extrusion, and defines an upwardly curved concave cradle surface 184. Each inflatable bunker member can be secured in the cradle 182 in a suitable manner such as bonding, mechanical fasteners, etc.

Figure 10A:
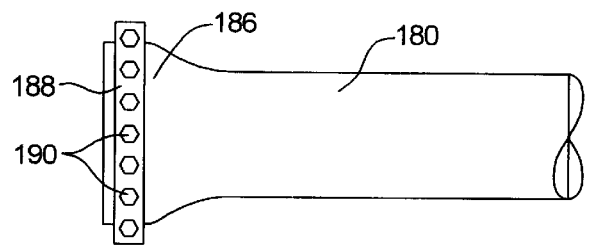
FIG. 10a is a first view of an end portion of the one of the inflatable bunkers.
Figure 10B:
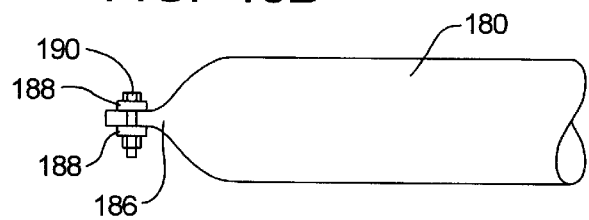
FIG. 10b is a second view of the end portion of the bunker, taken from the location which is 90° from the location in which 10a is being taken.

Reference is now made to FIGS. 10A and 10B which illustrate the end closure portion of the inflatable bunker 180. It can be seen that the end portion 186 is flattened, and there is positioned above and below the flattened portion 186 clamping plates 188 held together by a plurality of spaced nut and bolt connections 190. A suitable sealant can be placed at the end clamping location to ensure that there is an airtight seal. Suitable inflating and venting means can be supplied in the way of a typical air valve so that the proper pressure can be maintained in each of the inflatable bunkers 180. It has been found that these inflatable bunkers 180 provide a number of advantages. First, the cushioning action of each of the bunkers 180 is such so that the compressed upper surface areas of each bunker 180 are maintained at the same air pressure throughout. Thus, each unit of the contact area of the bunker 180 exerts a substantially uniform pressure against the engaged portion of the bottom surface of the hull 14. Also, as the transport apparatus 10 is moved over a ground surface, any impacts created by holes or bumps in the ground surface are substantially alleviated by the cushioning effect of these inflatable bunkers 180.

To now discuss another facet of the present invention, reference is made to FIG. 13 which is a rather schematic view showing the outline of the transport apparatus 10 which is positioned in a corridor 190, this corridor is bounded on two sides 192 and 194 by parking slots or stalls for boats and/or trailers or supports. In the schematic drawing in FIG. 13 the transport apparatus 10 is shown as an elongate rectangle 10, and the trailer is moving in the direction indicated at 195 with the forward end (i.e. the operating end) being shown at 50. It can be seen that the transport apparatus 10 can be turned in a path of travel indicated in the several broken line representations of the apparatus 10 location at 10a, 10b, 10c and 10d so that it can be placed into one of the slots indicated at 196. Further, it can be seen that the spacing of the two corridor sides 192 and 194 could be nearly the same as (or just slightly greater than) the total operating length of the transparent apparatus 10 plus the portion of the boat that may be overhanging the back end of the apparatus 10.

To discuss other features of the present invention, reference is now made to FIG. 2. In a conventional cabin cruiser, such as shown at 12, the center of gravity would be at a position moderately to the rear of a longitudinal center location of the cruiser. To explain this further, the total dimension from the bow to the stern of the cruiser 12 is in FIG. 2 shown by the line 200. Let us assume that the distance from the stern 20 to the bow 18 is 100%. In that instance, the center of gravity would usually be at the 40% location from the stern 20, indicated at 202. Now we turn our attention to the total length dimension between the center of the rear wheels 92 and the center of the front wheels 94, these being the two support locations, and this dimension is shown at 204. Let us assume that this dimension 204 is also considered to be 100%, with the location of the center of the rear wheels 92 being 0% and the center of the front wheels 94 being 100%. The pivot location 60 would be approximately half way between the two end support locations of the wheels 92 and 94, and in one preferred embodiment where the distance between the center of the front and rear wheels 92 and 94 is forty two feet, this pivot location 60 is at the 53% location measured from the center of the rear wheels 92.

In this particular embodiment of the present invention, the distance between the center of the front wheels 94 to the pivot location 60 is 19.5 feet, and the distance from the center of the rear wheels 92 to the pivot location 60 is 22 feet. These relative dimensions could be adjusted for various reasons, depending upon the size and type of boat which is being carried by the transport apparatus 10, the configuration of the boat ramp which is used, etc. In general, the pivot location 60 between the front and rear support locations of the wheels 92 and 94 would be between the 50–55% location from the stem 20, with this percentage value possibly being as high as up to 60% or up to possibly 65% or conceivably as high as about 70% or 75%. An upper reasonable limit would be no greater than a limit having the ratio length of the rear distance (the center of the rear wheels to the pivot location 60) to the forward distance (from the pivot location 60 to the center of the front wheels) no greater than about three to one. The distance from the center of the rear wheels 92 to the pivot location 60 would possibly be at the 45% distance or even 40% distance from the stem 20, with the reasonable lower limit being one-third of the total distance from the center of rear wheels 92 to the center of the front support wheels 94.

To relate this analysis to the operation of the present invention, it can be seen that with a relatively large boat 12 resting on the main frame 40, the center of gravity at 202 is positioned on the rear frame portion 58 at a location intermediate the pivot axis 60 and the rear wheels 92. Thus, the boat is supported by its rear portion resting on the inflatable bunkers 180, and the forward portion of the boat 12 extends into the forward receiving region 82 between the forward side frame members 66.

If a smaller boat is being either launched or removed from the water by the transport apparatus 10, then the total length of the boat could possibly be accommodated entirely by the rear frame portion 58. Thus it can be seen that the arrangement of the transport apparatus 10 is such that relative to overall length of the entire transport apparatus 10, it is possible that much larger boats (which heretofore have been removed from and placed into the water by means of a hoist) could be handled, as well as the smaller boats. Also, as indicated previously, this can be done so that a relatively large boat 12 can be maneuvered in a relatively small space and moved into a storage slot in a marina.

To explore yet another facet of the present invention, reference is made to FIGS. 4–7. It can be seen that the rear frame portion 58 has what could be termed a boat support plane indicated by the numeral 210. In this particular configuration, the boat support plane would be the planar alignment of the support surface of the bunker members 180. For convenience of illustration, in FIGS. 4–7, this support plane 210 has been shown as extending over the top surface of the inner rear frame members 146. Related to this analysis is the ground support alignment plane 212 of the underlying ground support plane relative to the support plane of the rear frame portion 58. Thus in FIGS. 4–7 the ground support reference plane 212 is defined by the ground engaging portions of the rear and front wheels 92 and 94. This ground support reference plane 212 is defined by the locations of the ground engaging support at the front and rear ends of the apparatus.

Reference is first made to FIG. 4, where the pivot location 60 is at its lowermost position, and the rear wheels 92 are in the retracted position. It can be seen that the alignment plane 210 has a very slight downward and forward slope, and the angular orientation relative to the support surface 212 is at an angle of about four degrees, indicated at 214. In FIG. 5, the rear wheels 92 have been moved downwardly to their lowermost position, and the angular orientation of the front and rear frame sections 58 and 56 remains the same. In this instance, the slope of the support plane 210 relative to the ground surface 212 is about six degrees, as indicated at 216.

In FIG. 6, the forward and rear frame sections 56 and 58 have been rotated relative to one another so as to raise the pivot location 60, and the orientation of the support plane 210 is nearly parallel to the lower support surface 212.

In FIG. 7, the orientation of the front and rear frame portions 56 and 58 remain the same as in FIG. 6, but the rear wheels 92 have been retracted. In this instance, the support plane 210 of the rear frame portion 58 is at a forward and upward slope of about two degrees, as indicated at 218.

To comment further on the above observations made with regard to the angular disposition of the rear support frame portion 58, it should be noted that in the configurations of FIG. 4 and FIG. 5 correspond to the positions shown in FIGS. 1 and 2, respectively, where the rear frame portion 58 would normally be positioned on the sloping ramp and in the water. Further, in the configuration of FIG. 6 this would be a usual configuration when the transport apparatus is being moved from the ramp onto level ground (as shown in FIG. 3) or entirely on a ground surface that is not beneath the water. The configuration of FIG. 7, could be used in a variety of situations, one of which is where the downward and rearward slope is desired where the frame portion 58 is on a ground surface when it is desired to drain the boat hull 14 of water.

Obviously, these various alignment relationships could vary from the values give above, and this could depend on the slope of the ramp surface and the slope and contour of the ground in the marina. With regard to the alignment in the configuration alignment angle in the operating arrangement of FIG. 4, this could be at an angle greater than zero degrees or greater than two degrees, and on the higher side could, depending upon the situation, be six degrees, eight degrees or ten degrees.

In the configuration of FIG. 5 the angular relationships discussed above with reference to FIG. 4 would apply, but the range could be greater depending on the slope of the ramp.

With regard to the configuration of FIG. 6, where the support plan 210 is nearly parallel to the support surface 212, this angle could also vary by one degree increments up to conceivably ten degrees (eg. one degree, two degrees . . . ten degrees) either upwardly or downwardly. In general, there would not be any great advantage in going up to these limits, but there could be particular situations where there would be advantages.

With regard to the operating configuration shown in FIG. 7, the two degree downward and rearward slope could obviously be decreased slightly, or it could be raised by various increments, such as one degree increments from three degrees, four degrees . . . up to ten degrees. This could occur for example, if the underlying ground surface is sloped to some extent. Alternatively, it may be that for certain boats the angle needs to be somewhat higher to cause proper drainage of the water in the hull.

d) Second Embodiment of the Present Invention.

Figure 14:
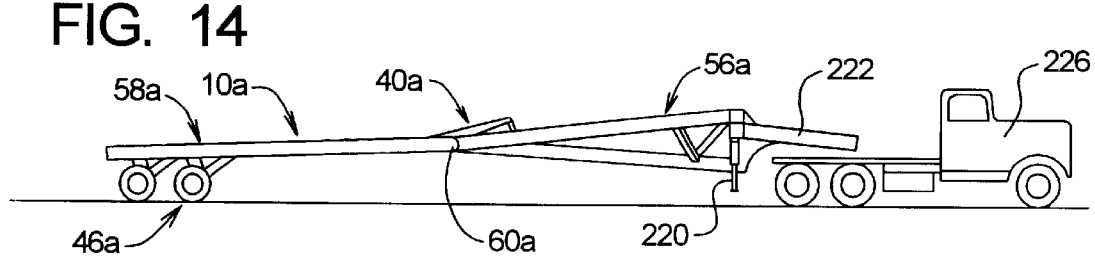
FIG. 14 is a side elevational view of a second embodiment of the present invention where the apparatus is being towed by a tractor.
Figure 15:
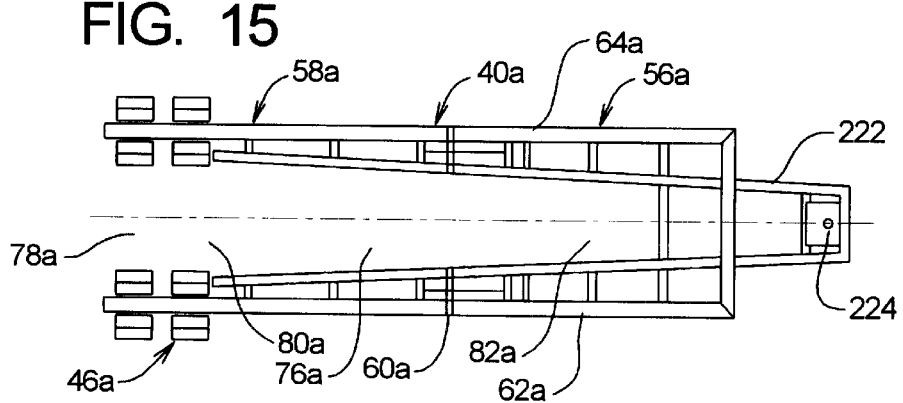
FIG. 15 is a top plan view of the apparatus of FIG. 14.

Reference is made to FIGS. 14 and 15 which show a second embodiment of the present invention. Components of this second embodiment which are the same as, or similar to, components of the first embodiment will be given like numerical designations, with an "a" suffix distinguishing those of the second embodiment.

This embodiment differs from the first embodiment in that the operating section 50 with the platform 52 has been removed and also the front wheel support section 48 has been removed. As in the first embodiment, the transport apparatus 10a comprises the main frame 40a with the rear wheeled support section 46a. The main frame 40a in turn comprises the front and rear main frame portions 56a and 58a; with a pivot location 60a. In addition, the main frame comprises the right and left side frame section 62 and 64. Also, there is the boat receiving regions 76a with a rear entry 78a and the rear and front region portions 80a and 82a, with the front region portion 80aextending into the forward frame section 56a.

In place of the front wheel section 48 of the first embodiment, there is provided a front support 220 extending downwardly from the forward end of the main frame 40a. This support 220 can simply be posts, or alternatively, these could also comprise wheels, such as the wheels 94 of the first embodiment, along with power for the wheels and also a mechanism for turning the wheels. These would be used in the event that the transport apparatus 10a would be moved independently of any towing vehicle.

In addition, there is a forward extension 222 fixedly attached to the front end of the main frame 40a, and this has a fifth wheel connection at 224. Thus, this could be carried by a tractor, as shown at 226, or another towing vehicle. Also, the forward part the main frame 40a could be provided with front jacks or other vertical actuators to raise or lower the front end of the main frame 40a to better enable the connection with a towing vehicle to be made.

It is believed the operation of this second embodiment is evident from the prior discussion of the operation of the first embodiment, so this will not be repeated at this location in this text.

It is to be recognized that various modifications could be made in the present invention without departing from the basic teachings thereof. For example, the specific construction of the main frame 40 and 40a (in the second embodiment) could have a different arrangement of the members such as the specific longitudinal beams, the cross bracing, etc. Since it is well within the skill of a designer of such truss like structures, there is no need to discuss the selections of the many types of beam and beam truss configurations that could be used. Also, with regard to the rear wheel support sections 46 and 46a, various actuators and devices for lifting and lowering the rear end could be used. Since the many linkages and actuators of various types are well known to those having skill in designing such mechanical devices, there is no need to list the various possibilities, such as crank arms, toggle devices, rotary actuators, scissors linkages, etc.

The main components of the present invention are defined in the claims submitted herewith and it is obvious that such modifications could be made within the scope of these claims.

I claim:

1. A boat transport apparatus adapted to remove a boat from a body of water and/or launch a boat into a body of water, said apparatus comprising:

a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;

b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;

c) a first actuator section having an operative power connection to said forward and rear main frame sections and arranged to apply forces thereto to cause relative rotation between said forward and rear main frame sections between said lower pivot configuration and said upper pivot configuration;

d) a rear wheeled support section being connected to the rear main frame section and moveable between upper and lower configurations relative to the rear main frame section;

e) a forward support section connected to the forward main frame section;

f) a second actuator section having an operative power connection to said rear wheeled support section to move said rear wheeled support section between said upper configuration and said lower configuration;

g) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration so that the rear main frame section is at a lower position so that a boat can be moved over the main rear frame section, and by lowering the rear support section to engage an underlying ground surface and operating the second actuator section to lift the boat in the water so that the weight of the boat is at least partially supported by the rear main frame section, the rear main frame section is at a second higher ground elevation in the body of water, so that the apparatus can carry the boat out of the water, and the first actuator can be operated as needed to raise or lower the pivot location for further lifting or lowering the boat, or for ground clearance or other reasons.

2. The apparatus as recited in claim 1, where each of the main frame side portions has its own pivot connection between its related forward main frame side portion and rear main frame side portion.

3. The apparatus as recited in claim 1, wherein said forward main frame section has a front end frame portion connected between forward end portions of the forward main frame side portions.

4. The apparatus as recited in claim 1, wherein said forward support section comprises a connection component adapted to be connected to a towing apparatus to move the transport apparatus.

5. The apparatus as recited in claim 1, wherein said rear wheeled support section is arranged to provide ground support at a support location at a rear portion of said rear main frame section.

6. The apparatus as recited in claim 5, wherein said forward support section has a support location at a forward portion of the forward main frame section.

7. The apparatus as recited in claim 1, wherein said apparatus is arranged and sized so as to be able to support a boat of a smaller length dimension and also a boat up to a larger maximum length dimension extending into the forward boat receiving portion, said rear main frame section being configured and having a length such that a boat of the maximum length dimension being carried by said apparatus has a center of gravity which, when the boat is positioned on said apparatus, is behind said pivot location, such that at least a substantial portion of weight of the boat is supported by said rear main frame section.

8. A boat transport apparatus adapted to remove a boat from a body of water and/or launch a boat into a body of water, said apparatus comprising:

a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;

b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;

c) a rear wheeled support section being connected to the rear main frame section and moveable between upper and lower configurations relative to the rear main frame section;

d) a forward support section connected to the forward main frame section;

e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;

f) each of the main frame side portions having its own pivot connection between its related forward main frame side portion and rear main frame side portion, and each of the rear main frame side portions can rotate independently from one another about its related pivot connection relative to its forward main frame side portion.

9. The apparatus as recited in claim 8, wherein the front and rear main frame side portions of each main frame side portion have a related actuator to move the rear main frame side portion relative to its related forward main frame side portion.

10. A boat transport apparatus adapted to remove a boat from a body of water and/or launch a boat into a body of water, said apparatus comprising:
   a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
   b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;
   c) a rear wheeled support section being connected to the rear main frame section and moveable between upper and lower configurations relative to the rear main frame section;
   d) a forward support section connected to the forward main frame section;
   e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;
   f) each of the main frame side portions having its own pivot connection between its related forward main frame side portion and rear main frame side portion;
   g) said rear wheeled support section comprising left and right wheeled rear support portions, each of which has a wheel portion and a related actuator to raise or lower the wheel portion.

11. A boat transport apparatus adapted to remove a boat from a body of water and/or launch a boat into a body of water, said apparatus comprising:
   a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
   b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;
   c) a rear wheeled support section being connected to the rear main frame section and moveable between upper and lower configurations relative to the rear main frame section;
   d) a forward support section connected to the forward main frame section;
   e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;
   f) said forward support section comprising a steerable wheeled section.

12. The apparatus as recited in claim 11, wherein said steerable wheeled section comprises at least two steerable wheels spaced laterally from one another with each steerable wheel having its own steering axis about which each steerable wheel can be rotated to various steering positions at least up to about 90° of rotation from straight ahead alignment.

13. The apparatus as recited in claim 11, further comprising an operating station which is at a forward location of the forward main frame section and at which an operator can control operation of said apparatus.

14. A boat transport apparatus adapted to remove a boat from a body of water and/or launch a boat into a body of water, said apparatus comprising:
   a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
   b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;
   c) a rear wheeled support section being connected to the rear main frame section and moveable between upper and lower configurations relative to the rear main frame section;
   d) a forward support section connected to the forward main frame section;
   e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;

f) said rear support section having a rear ground engaging support location and said forward support section having a support location by which the forward main frame section is supported from a ground surface, said pivot location being located at a pivot location spacing distance between about one third to three quarters of a distance from said rear ground engaging support location to said forward support location.

15. The apparatus as recited in claim 14, wherein said pivot location spacing distance is no greater than about two-thirds of the distance from said rear ground engaging support location to said forward support location.

16. The apparatus as recited in claim 14, wherein said pivot location is amended about two fifths to three fifths of the distance from said rear ground engaging support location to said forward support location.

17. The apparatus as recited in claim 14, wherein said pivot location is about one half of the distance from said rear ground engaging support location to said forward support location.

18. A boat transport apparatus adapted to remove a boat from a body of water and/or launch a boat into a body of water, said apparatus comprising:

a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;

b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;

c) a rear wheeled support section being connected to the rear main frame section and moveable between upper and lower configurations relative to the rear main frame section;

d) a forward support section connected to the forward main frame section;

e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;

f) the two rear main frame side portions each having a longitudinally extending boat engaging support portion, each of said support portions comprising a longitudinally extending inflatable bunker to provide support for a boat being positioned thereon.

19. The apparatus as recited in claim 18, wherein said apparatus is arranged and sized so as to be able to support a boat of a smaller length dimension extending into the forward boat receiving portion, said rear main frame section being configured and having a length such that a boat of the maximum length dimension being carried by said apparatus has a center of gravity which, when the boat is positioned on said apparatus, is behind said pivot location, such that at least a substantial portion of weight of the boat is supported by said inflatable bunkers.

20. A boat transport apparatus adapted to remove a boat from a body of water and/or launch a boat into a body of water, said apparatus comprising:

a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;

b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;

c) a rear wheeled support section being connected to the rear main frame section and moveable between upper and lower configurations relative to the rear main frame section;

d) a forward support section connected to the forward main frame section;

e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water;

f) said apparatus being arranged so that the rear main frame section is able to support at least a substantial portion of weight of a boat having a lengthwise dimension at least as great or greater than a lengthwise dimension of the rear main frame section so that when carried by the apparatus, a forward end portion of the boat extends into the forward boat receiving region portion, and said right and left rear main frame side portions have longitudinally extending support surface portions which engage the boat and which are positioned in a boat support reference plane, and said apparatus has a ground support reference plane which is defined at a rear support location by a rear ground support location of the rear support section and at the forward end of the apparatus by a forward ground support location of the forward support section, said apparatus being arranged so that with the rear support section in its lower configuration, and with the main support frame being in its lower pivot configuration, the boat support reference plane has a downward and forward slant relative to the ground support reference plane.

21. The apparatus as recited in claim 20, wherein said apparatus is arranged so that with the rear support section being in its lower configuration and the main support frame being in its lower pivot configuration the downward and forward slope relative the ground support reference plane is between about 2° to 12°.

22. The apparatus as recited in claim 20, wherein said apparatus is arranged so that with the rear support section being in its upper configuration and the main support frame being in its lower pivot configuration said boat support reference plane of the apparatus has a forward and downward slope relative the ground support reference plane.

23. The apparatus as recited in claim 22 wherein said apparatus is arranged so that with the rear support section being in its upper configuration and the main support frame being in its lower pivot configuration said boat support reference plane of the apparatus has a forward and downward slope relative the ground support reference plane at an angle between about 0° and 10°.

24. The apparatus as recited in claim 20, wherein said apparatus is arranged so that with the rear support section being in its upper configuration and the main support frame being in its upper pivot configuration said boat support reference plane of the apparatus does not have a forward and downward slope relative the ground support reference plane.

25. The apparatus as recited in claim 24, wherein said apparatus is arranged so that with the rear support section being in its upper configuration and the main support frame being in its upper pivot configuration, said boat support reference plane of the apparatus has a forward and upward slope relative the ground support reference plane.

26. The apparatus as recited in claim 20, wherein said apparatus is arranged so that with the rear support section being in its lower configuration and the main support frame being in its upper pivot configuration said boat support reference plane of the apparatus is approximately parallel to its ground support reference plane.

27. The apparatus as recited in claim 20, wherein said apparatus is arranged so that with the rear support section being in its lower configuration and the main support frame being in its upper pivot configuration, said boat support reference plane of the apparatus is aligned relative the ground support reference plane, so that an angle of the boat support plane relative to the ground reference plane is between about 4° in an upward and rearward slant.

28. A method of removing a boat from a body of water, said method comprising:
a) providing a boat removing apparatus, comprising:
i. a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
ii. said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;
iii. a rear wheeled support section being connected to the rear main frame section and moveable between upper and lower configurations relative to the rear main frame section;
iv. a forward support section connected to the forward main frame section;
b) positioning said apparatus in an operating position in a body of water, so that the rear main frame section is located at a first lower ground elevation in the body of water, with the rear support section in its upper configuration and the main support frame in its lower pivot configuration;
c) locating the boat in the body of water over the rear main frame section, with the rear support section in its upper configuration and the rear main frame section in its lower pivot configuration;
d) lowering the rear support section to raise the rear main frame section to a second higher ground elevation in the body of water to raise the boat in the body of water;
e) moving the apparatus to carry the boat in a direction from the body of water.

29. The method as recited in claim 28, further comprising subsequently raising and lowering the main support frame between its upper and lower pivot configuration or also raising or lowering the rear support location between its upper configuration and lower configuration with the apparatus being positioned on or traveling over a ground surface.

30. The method as recited in claim 28, wherein each of the main frame side portions is rotated about its own pivot connection between its related forward main frame side portion and rear main frame side portion, so that each of the rear main frame side portions can rotate independently from one another about its related pivot connection relative to its forward main frame side portion.

31. The method as recited in claim 28, wherein said forward main frame section has a front end frame portion connected between forward end portions of the forward main frame side portions, and said forward support section comprises a steerable wheeled section, said method further comprising steering two steerable wheels spaced laterally from one another with each steerable wheel having its own steering axis about which each steerable wheel can be rotated to various steering positions up to 90° of rotation from straight ahead alignment.

32. The method as recited in claim 28, wherein said rear support section has a rear ground engaging support location and said forward support section has a forward support location by which the forward main frame section is supported from a ground surface, said method further comprising providing said pivot location being at a pivot location spacing distance between about one third to three quarters of a distance from said rear ground engaging support location to said forward support location.

33. The method as recited in claim 28, wherein the two rear main frame side portions each have a longitudinally extending boat engaging support portion, said method further comprising providing each of said support portions with a longitudinally extending inflatable bunker to provide support for a boat being positioned thereon.

34. The method as recited in claim 33, wherein said apparatus is arranged and sized so as to be able to support a boat of a smaller length dimension and also a boat up to a larger maximum length dimension extending into the forward boat receiving portion, said method further comprising configuring said rear main frame section so that a boat of the maximum length dimension is carried by said apparatus with a center of gravity of the boat being positioned on said apparatus behind such said pivot location that at least a substantial portion of weight of the boat is supported by said inflatable bunkers.

35. A method adapted to launch a boat into a body of water, said method comprising:
 a) providing a boat launching apparatus, comprising:
  i. main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
  ii. said forward and rear main frame sections being arranged as right and left main frame side portions right and left main frame side portions each of which comprises a forward main frame side portion and a rear main frame side portion, and which define therebetween a boat receiving region comprising a rear entry portion, a rear boat receiving region portion located between the right and left main frame rear side portions at the rear main frame section, and a forward boat receiving region portion located between the right and left forward main frame side portions at the forward frame section;
  iii. rear wheeled support section being connected to the rear main frame section and moveable between upper and lower configurations relative to the rear main frame section;
  iv. a forward support section connected to the forward main frame section;
 b) locating the boat on said apparatus, moving said apparatus into a body of water to a launching location, and locating the rear main frame section at a lower ground elevation in the body of water, with the rear support section in its upper configuration and the main support frame in its lower pivot configuration, so that the boat is substantially supported by a flotation force of the water.

36. The method as recited in claim 35, wherein prior to moving the apparatus to the launching location, the rear support section is in a configuration to have the boat at a higher elevation.

37. The method as recited in claim 35, wherein each of the main frame side portions is rotated about its own pivot connection between its related forward main frame side portion and rear main frame side portion, so that each of the rear main frame side portions can rotate independently from one another about its related pivot connection relative to its forward main frame side portion.

38. The method as recited in claim 35, wherein said forward main frame section has a front end frame portion connected between forward end portions of the forward main frame side portions, and said forward support section comprises a steerable wheeled section, said method further comprising steering two steerable wheels spaced laterally from one another with each steerable wheel having its own steering axis about which each steerable wheel can be rotated to various steering positions up to 90° of rotation from straight ahead alignment.

39. The method as recited in claim 35, wherein said rear support section has a rear ground engaging support location and said forward support section has a forward support location by which the forward main frame section is supported from a ground surface, said method further comprising providing said pivot location being at a pivot location spacing distance between about one third to three quarters of a distance from said rear ground engaging support location to said forward support location.

40. The method as recited in claim 35, wherein the two rear main frame side portions each have a longitudinally extending boat engaging support portion, said method further comprising providing each of said support portions with a longitudinally extending inflatable bunker to provide support for a boat being positioned thereon.

41. The method as recited in claim 35, wherein said apparatus is arranged and sized so as to be able to support a boat of a smaller length dimension, and also a boat up to a larger maximum length dimension extending into the forward boat receiving portion said method further comprising configuring said rear main frame section so that a boat of the maximum length dimension is carried by said apparatus with a center of gravity of the boat being positioned on said apparatus behind said pivot location such that at least a substantial portion of weight of the boat is supported by said inflatable bunkers.

42. A boat transport apparatus adapted to remove a boat from a body of water and/or launch a boat into a body of water, said apparatus comprising:
 a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;
 b) said forward and rear main frame sections being arranged as right and left main frame side portions, each of which comprises a forward main frame side portion and a rear main frame side portion, and which define therebetween a substantially unobstructed boat receiving region which is arranged to receive a lower center keel portion of a boat with bottom side portions of the boat being supported by the right and left main frame side portions and which comprises a rear entry portion, a rear boat receiving region portion located between the right and left rear main frame side portions at the rear main frame section, and a forward boat receiving region portion located between the right and left forward main frame side portions at the forward frame section;
 c) a rear wheeled support section being connected to the rear main frame section and moveable between upper and lower configurations relative to the rear main frame section;

d) a forward support section connected to the forward main frame section;

e) said apparatus being arranged so that with said apparatus in an operating position in a body of water, the rear main frame section is able to be located at a first lower ground elevation in the body of water, with the rear wheeled support section in its upper configuration and the main support frame in its lower pivot configuration, and by lowering the rear support section, the rear main frame section is at a second higher ground elevation in the body of water.

43. The apparatus as recited in claim 42, where each of the main frame side portions has its own pivot connection between its related forward main frame side portion and rear main frame side portion.

44. The apparatus as recited in claim 43, wherein each of the rear main frame side portions can rotate independently from one another about its related pivot connection relative to its forward main frame side portion.

45. The apparatus as recited in claim 43, wherein said rear wheeled support section comprises left and right wheeled rear support portions, each of which has a wheel portion and a related actuator to raise or lower the wheel portion.

46. The apparatus as recited in claim 42, wherein said forward main frame section has a front end frame portion connected between forward end portions of the forward main frame side portions, and said forward support section comprising a steerable wheeled section.

47. The apparatus as recited in claim 46, wherein said steerable wheeled section comprises at least two steerable wheels spaced laterally from one another with each steerable wheel having its own steering axis about which each steerable wheel can be rotated to various steering positions up to at least about 90° from straight ahead alignment.

48. The apparatus as recited in claim 46, further comprising an operating station which is at a forward location of the forward main frame section and at which an operator can control operation of said apparatus.

49. The apparatus as recited in claim 42, wherein rear wheeled support section is arranged to provide ground support at a support location at a rear portion of said rear main frame section, and said forward support section has a support location at a forward portion of the forward main frame section.

50. A boat transport apparatus adapted to remove a boat from a body of water and/or launch a boat into a body of water, said apparatus comprising:

a) a main support frame having a longitudinal axis, a transverse axis, a front end, and a rear end, said main support frame comprising a forward main frame section and a rear main frame section, said forward and rear main frame sections being pivotally connected to one another about a pivot location, so as to be able to be rotated relative to one another between an upper pivot configuration of the main support frame with the pivot location at a higher elevation and a lower pivot configuration of the main support frame with the pivot location at a lower elevation;

b) said forward and rear main frame sections being arranged as right and left main frame side portions, each of which comprises a forward main frame side portion and a rear main frame side portion, and which define therebetween a boat receiving region comprising a rear entry portion, a rear boat receiving region portion located between the right and left rear main frame side portions at the rear main frame section, and a forward boat receiving region portion located between the right and left forward main frame side portions at the forward frame section;

c) a rear wheeled support section being connected to the rear main frame section and moveable between upper and lower configurations relative to the rear main frame section;

d) a forward support section connected to the forward main frame section;

e) said apparatus being arranged so that with said apparatus in an operating position in a body of water, the mass of the apparatus is sufficiently large relative to the volume of water displaced by that portion of the apparatus that is under the water so that at least the rear main frame section is able to sink beneath the surface of the water to be located at a first lower ground elevation in the body of water, with the rear wheeled support section in its upper configuration and the main support frame in its lower pivot configuration, and by lowering the rear support section, the rear main frame section is at a second higher ground elevation in the body of water.

* * * * *